(12) United States Patent
Hansen

(10) Patent No.: US 6,241,884 B1
(45) Date of Patent: Jun. 5, 2001

(54) LIQUID TREATMENT CARTRIDGE

(76) Inventor: Austin C. Hansen, 445 Forest Hills Dr., Atlanta, GA (US) 30342

( * ) Notice: Subject to any disclaimer, the term of this patent is extended or adjusted under 35 U.S.C. 154(b) by 0 days.

(21) Appl. No.: 09/679,422

(22) Filed: Oct. 4, 2000

Related U.S. Application Data

(63) Continuation-in-part of application No. 09/442,935, filed on Nov. 18, 1999.

(51) Int. Cl.$^7$ ............................. C02F 5/08; B01D 11/02
(52) U.S. Cl. ...................... 210/198.1; 422/264; 422/278; 137/268
(58) Field of Search ...................... 210/198.1; 422/264, 422/278; 137/268

(56) References Cited

U.S. PATENT DOCUMENTS

| | | |
|---|---|---|
| 1,252,872 | 1/1918 | Yoggerst et al. . |
| 2,135,932 | 11/1938 | Belmont . |
| 2,955,923 | 10/1960 | Atkinson . |
| 3,195,558 * | 7/1965 | Klueber et al. . |
| 3,289,847 * | 12/1966 | Rothemund . |
| 3,306,709 | 2/1967 | Atkinson . |
| 3,442,800 | 5/1969 | Jasionowski . |
| 3,443,590 | 5/1969 | Wagner et al. . |
| 3,476,137 | 11/1969 | Eisendrath . |
| 3,887,468 | 6/1975 | Bray . |
| 4,059,522 | 11/1977 | Polley et al. . |
| 4,347,224 | 8/1982 | Beckert et al. . |
| 4,531,659 | 7/1985 | Wright . |
| 4,548,227 * | 10/1985 | Regunathan et al. . |
| 4,691,732 * | 9/1987 | Johnson et al. . |
| 4,780,197 | 10/1988 | Schuman . |
| 5,053,206 | 10/1991 | Maglio et al. . |
| 5,181,533 | 1/1993 | Kooi . |
| 5,443,569 | 8/1995 | Uehira et al. . |
| 5,462,208 | 10/1995 | Stahley et al. . |
| 5,507,945 | 4/1996 | Hansen . |
| 5,580,448 | 12/1996 | Brandreth, III . |
| 5,913,327 * | 6/1999 | Zhadanov et al. . |

* cited by examiner

Primary Examiner—Thomas M. Lithgow
(74) Attorney, Agent, or Firm—Fitch, Even, Tabin & Flannery

(57) ABSTRACT

A dispense device includes a dispense head and threaded canister. A chemical container assembly disposed within the canister includes a support column which telescopically receives a chemical container. The chemical container includes inlet and outlet holes to allow a flow through the container to come into contact and subsequently dissolve chemical treatment material disposed within the container. The support column engages the dispense head to aid in defining the separation distance between the dispense head and the outlet hole of the chemical container.

28 Claims, 7 Drawing Sheets

LIQUID TREATMENT CARTRIDGE

CROSS REFERENCE TO RELATED APPLICATION

This is a continuation-in-part of U.S. patent application Ser. No. 09/442,935 filed Nov. 18, 1999.

BACKGROUND OF THE INVENTION

1. Field of the Invention

The present invention pertains to the chemical treatment of liquids, such as water for food processing and other uses.

2. Description of the Related Art

Many commercial and residential water supplies suffer from "hard water" and other objectionable conditions. Oftentimes, remedial measures are implemented with the addition of chemical treatments to the water supply. In order to provide effective treatment and to prevent other problems from occurring, it may be necessary to carefully meter the amount of chemical treatment agent to a given quantity of supplied water.

A liquid treatment apparatus as described in commonly assigned U.S. Pat. No. 5,507,945 has proven commercially successful, particularly in the treatment of water supplies used for food preparation and other applications. The liquid treatment apparatus provides a chemical treatment agent which is put into solution and mixed with water flowing through the apparatus. More particularly, the liquid treatment apparatus includes a dispense head which develops a venturi action which is applied so as to help meter relatively small amounts of treatment chemical in the fluid flow. The liquid treatment apparatus includes, in addition to the aforementioned dispense head, a canister which threadingly engages the dispense head and which receives a container holding the chemical agent. The dispense head is typically joined to a piping system and has means for attachment to a mounting bracket if additional support is required. In operation, the canister is unthreaded from the dispensing head to allow replenishment of the chemical treating agent, as may be required. While the chemical treatment apparatus has been met with widespread commercial acceptance, it is desirable to provide low cost alternative systems which can be made operational by a simple retrofit to existing equipment, such as pre-filter housings, which are easily implemented by operators who are not familiar with dispenser and fluid metering technologies.

U.S. Pat. No. 5,580,448 discloses a chemical dispenser having a cartridge, used either alone or with an outer surrounding filter sleeve. The cartridge includes an apertured mid-section located between an upper solid wall conduit segment and a lower chemical-containing cartridge member which includes a dispensing aperture at its upper end. Thus, the amount of chemical treatment agent which can be provided, is reduced by the amount of the combined volume of the solid wall conduit segment and the apertured mid-section. Improvements to cartridges of this type are continuously being sought.

In various types of commercial activities, such as produce handling, food stores and restaurants, the available domestic water supply is employed to carry out commercial operations. Remedial measures to address problems of corrosion and scaling, are sometimes carried out with the introduction of small amounts of a treatment chemical, such as polyphosphate or sodium silicate, into the domestic water supply. Operators of the commercial establishments may not have the time or training required to appreciate the subtle operations of the chemical dispensing systems which are relied upon to control various water supply problems. It is advantageous to provide water treatment apparatus which is readily understood and easily maintained by operators of commercial establishments and other members of the community requiring water treatment.

SUMMARY OF THE INVENTION

It is an object of the present invention to provide chemical treatment apparatus for introducing relatively small amounts of a treatment chemical into a liquid supply.

Another object of the present invention is to provide a liquid treatment apparatus of the type which meters a treatment chemical into a liquid flow.

A further object of the present invention is to provide liquid treatment apparatus which can be integrated with a conventional plumbing system to meter a treatment chemical into a domestic water supply delivered by the plumbing system.

Yet another object of the present invention is to provide liquid treatment apparatus of the above-described type having a replaceable cartridge.

A further object of the present invention is to provide liquid treatment apparatus of the above-described type having an improved cartridge insert offering an enhanced reliability of operation.

These and other objects of the present invention are provided in apparatus for insertion into a liquid flow line for dispensing a soluble chemical into the liquid flowing through the flow line comprising:
  a dispense head member including an inlet and an outlet and defining a flow passageway coupling the inlet and the outlet;
  a canister;
  said dispense head flow passageway including flow entry means for directing fluid flow into said hollow interior cavity and flow exit means for directing fluid flow out of said hollow interior cavity;
  the dispense head member and the canister having cooperating means for removably attaching the dispense head to the canister;
  a chemical holding container adapted to fit within said canister;
  said chemical holding container having opposed upper and lower ends and defining inlet and outlet flow pathways at its upper end; and
  said chemical holding container further including a cap comprising a unitary monolithic body having a center portion defining socket means for connection to said dispense head so as to bring said outlet flow pathway of said chemical holding container in flow communication with the flow passageway of said dispense head.

Other advantages are provided in a dispensing device for dispensing a chemical agent into a fluid flow, comprising:
  a dispense head having inlet and outlet means for coupling to said fluid flow and defining a flow passageway coupling said inlet and said outlet means;
  a canister engageable with said dispense head and defining a hollow interior cavity;
  said flow passageway in said dispense head including flow entry means for directing fluid flow into said hollow interior cavity and flow exit means for directing fluid flow out of said hollow interior cavity of said canister;

a chemical holding container within said hollow interior cavity of said canister, in contact with the fluid flow;

said chemical holding container having a tubular body with opposed upper and lower ends and defining a hollow, chemical-receiving interior;

said tubular body including an inlet aperture portion adjacent its upper end; and a cap enclosing the upper end of said tubular body, said cap comprising a unitary monolithic body having a center portion defining socket means extending into said tubular body hollow interior and providing at least one outlet aperture for flow connection to said flow exit means.

DETAILED DESCRIPTION OF THE PREFERRED EMBODIMENTS

Figure 1:
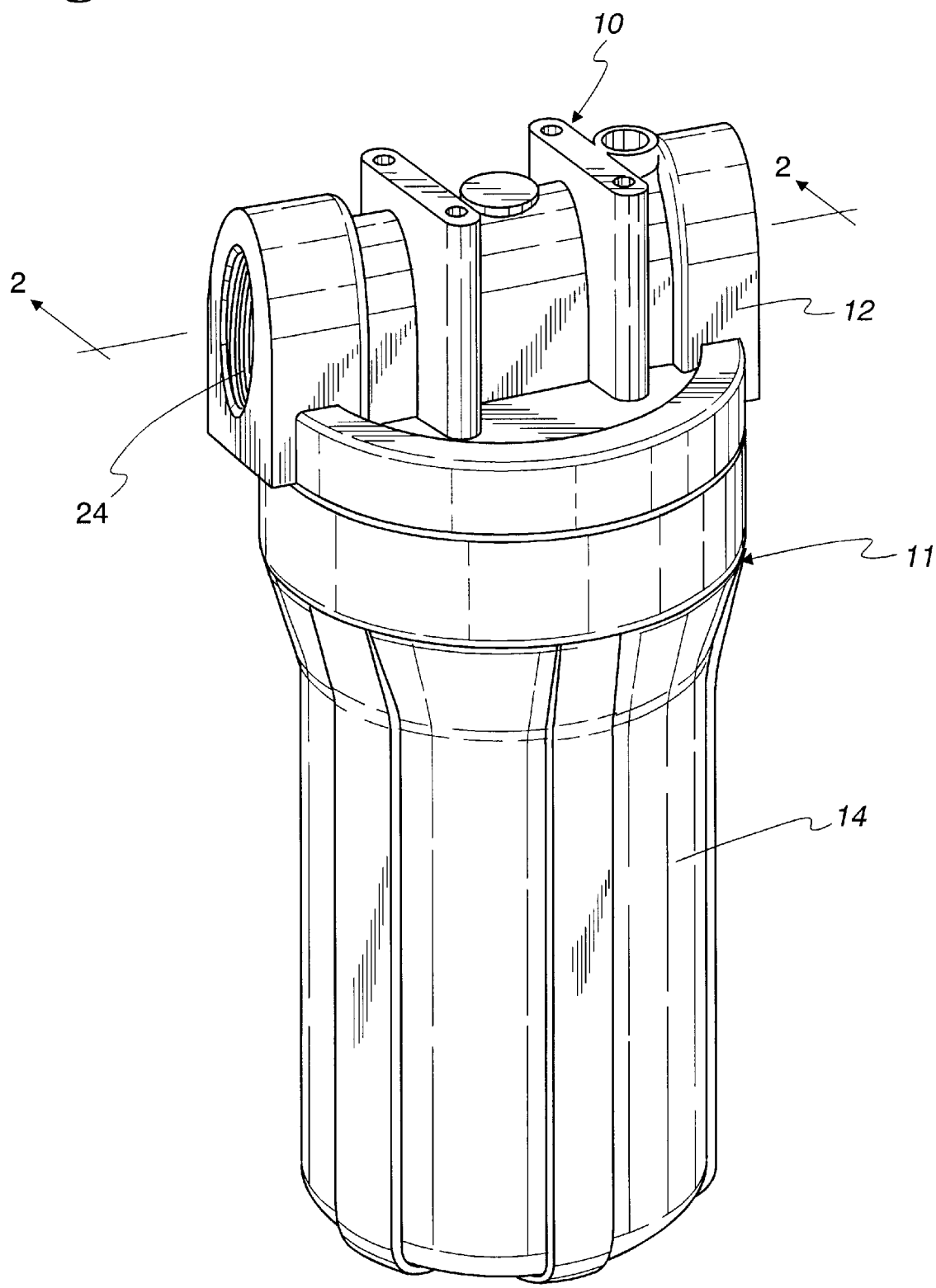
FIG. 1 is a perspective view of a dispensing apparatus.

Referring now to FIGS. 1–4, a dispensing device according to principles of the present invention is generally indicated at 10. The dispensing device 10 comprises a fluid-tight, preferably pressure-tight vessel or housing 11 comprising a dispense head 12 and a sump or canister 14. As can be seen, for example in FIG. 4, the dispense head and canister have interfitting threaded portions 16, 18, respectively. A conventional O-ring seal 20 is the preferred mode of providing leak-free joiner of the dispense head and canister.

Figure 2:
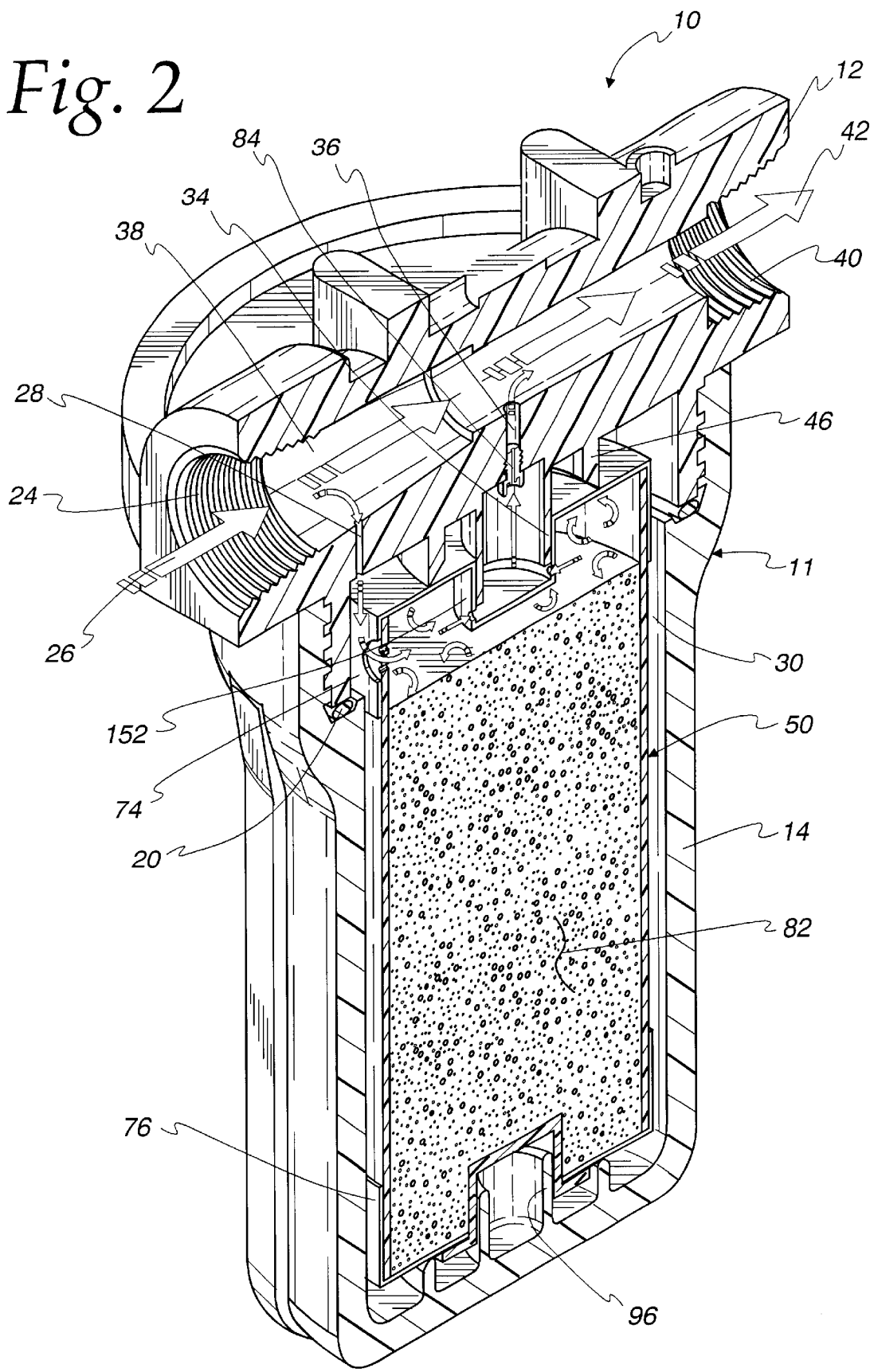
FIG. 2 is a cross-sectional vies thereof taken along the lines 2—2 of FIG. 1.
Figure 4:
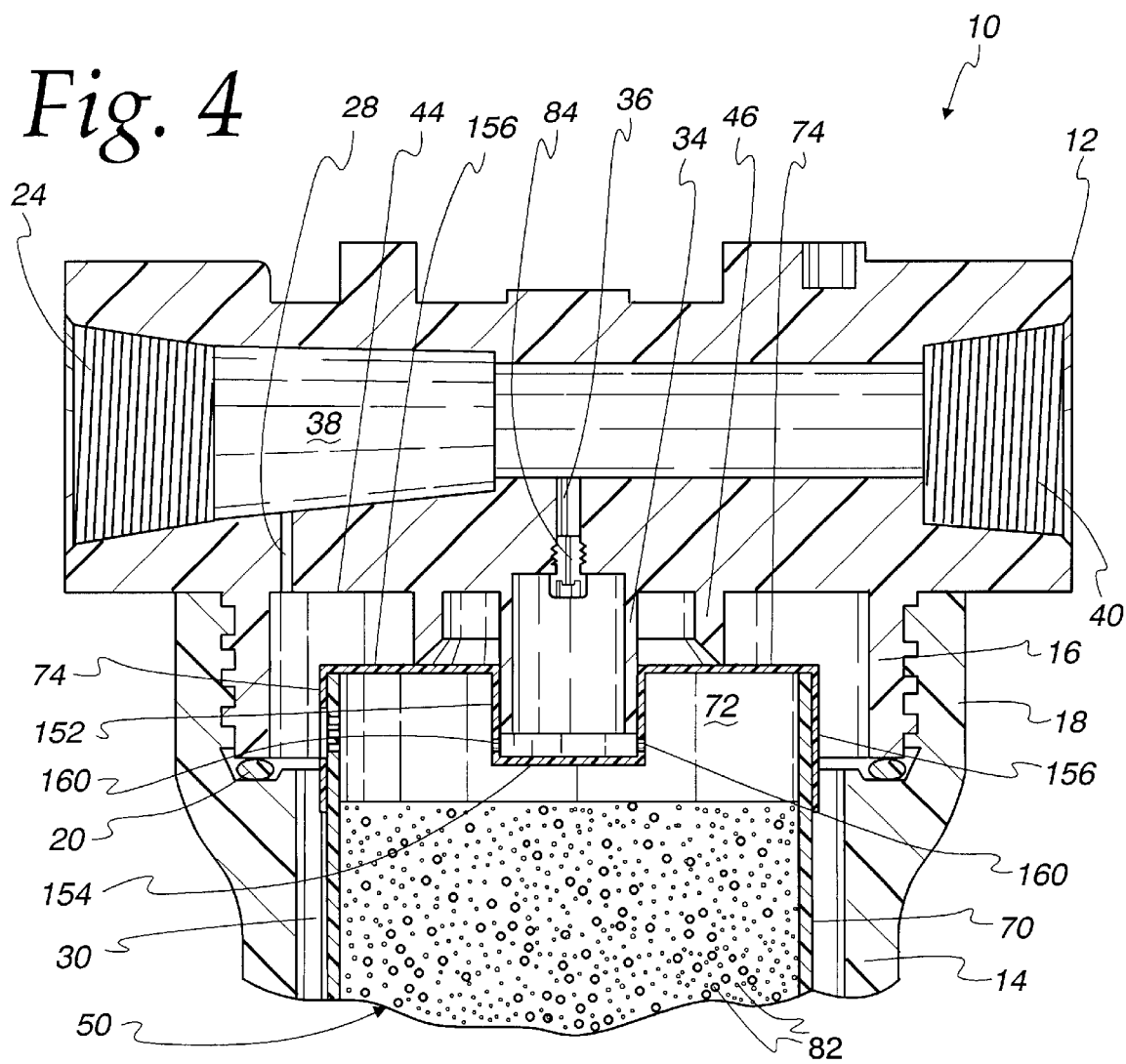
FIG. 4 is a cross-sectional view showing the upper portion of FIG. 2 on an enlarged scale.
Figure 5:
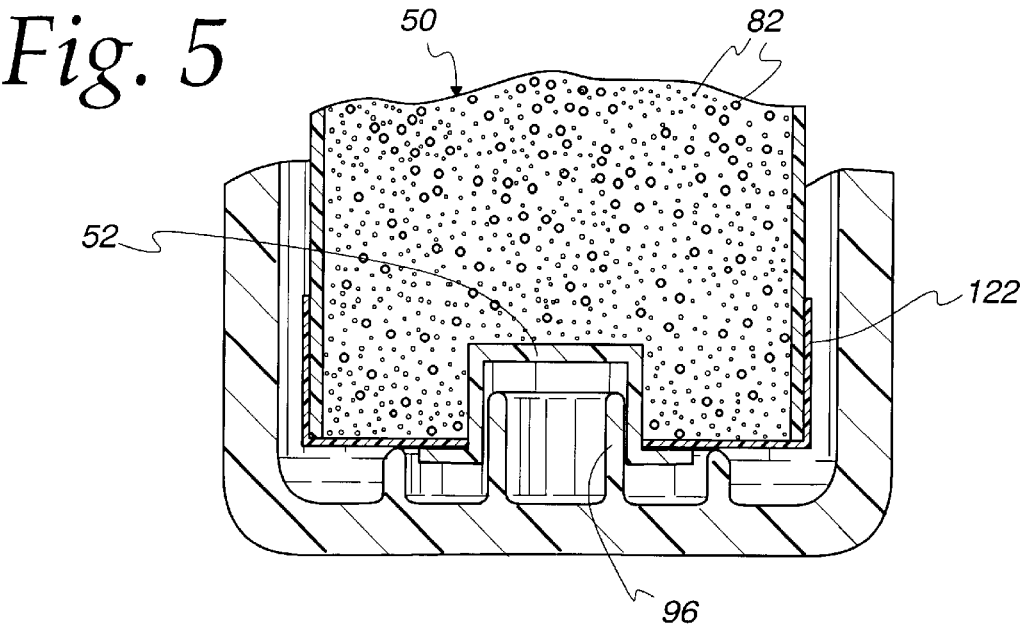
FIG. 5 is a fragmentary cross-sectional view showing the bottom portion of FIG. 2 on an enlarged scale.

Referring to FIGS. 2 and 4, the dispense head 12 is preferably of monolithic molded plastic design. An inlet 24, preferably threaded, accepts a pressurized fluid flow indicated by the arrow 26. Incoming flow enters through an internal hole 28, into the interior 30 of the canister 14. The incoming flow fills the entire interior of canister 14 and eventually exits through a flow exit means in the form of a stub portion or projection 34, through outlet passageway 36, entering main bore 38 and passing through threaded outlet opening 40, as indicated by arrow 42. As can be seen in FIGS. 2 and 4, the projection 34 comprises a stub-like nipple projecting beyond the bottom wall 44 of dispense head 12, and slightly beyond annular wall 46, into the hollow cavity of canister 14.

Dispense head 12 can take on configurations other than that illustrated in the figures. For example, the present invention can be employed with existing pre-filter housings to provide a retrofit upgrade which adds chemical treatment to the fluid being processed. Further benefits are enjoyed by the present invention in that maintenance operations, oftentimes carried out by a store operator who implements a familiar service routine, similar to that of replacing a filter element. With the present invention, metering accuracies previously associated with venturi-type dispensing heads can now be enjoyed with dispensing heads of a simplified pre-filter type.

Preferably, the present invention provides flow regulation for dispensing devices which are pressure-induced, rather than relying on the suction effects of venturi flow, as in earlier designs. However, since it may also be expedient at times to incorporate the present invention with dispensing devices of the venturi flow type, the present invention also provides a chemical container assembly (to be described below) which can be readily employed with venturi devices, such as the venturi-type cap 48 as disclosed in commonly assigned U.S. Pat. No. 5,507,945, which is herein incorporated by reference.

Figure 3:
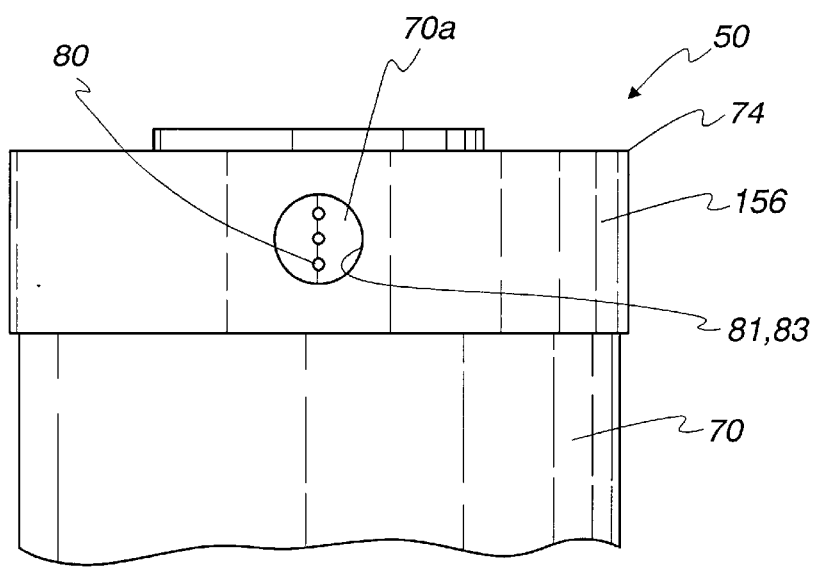
FIG. 3 is a fragmentary elevational view of the cartridge insert of FIG. 2.

Referring to FIGS. 2 and 3, dispensing device 10 further includes a chemical container assembly generally indicated at 50. Chemical container assembly 50 includes a hollow tubular body 70 enclosed at its upper and lower ends by end caps 74, 76, respectively. The upper end of the chemical container assembly has inlet and outlet flow pathways formed by one or more holes in the end cap 74 and tubular body 70. In the preferred embodiment, a linear series of three holes 80 are formed in the underlying, upper end of tubular body 70. Preferably, the holes 80 are aligned generally parallel to a central axis of the chemical container tubular body. Holes 80 allow introduction of surrounding fluids to enter the hollow interior of tubular body 70, so as to contact the treatment chemical 82. If desired, the holes 80 can extend to holes formed in end cap 74. Preferably, however, a single large aperture or hole 81 is formed by edge 83 in upper end cap 74 so as to expose an inlet aperture portion 70a of tubular body 70 surrounding holes 80. Aperture 81 allows incoming fluid flow unobstructed access to holes 80 formed in tubular body 70. The length of the passageway at fluid must travel to enter the interior 72 of body 70 is significantly reduced compared to prior art arrangements, such as that shown in FIG. 9, where holes 120 pass continuously through upper end cap 122 and body wall 124 of a dispense apparatus 130.

Figure 9:
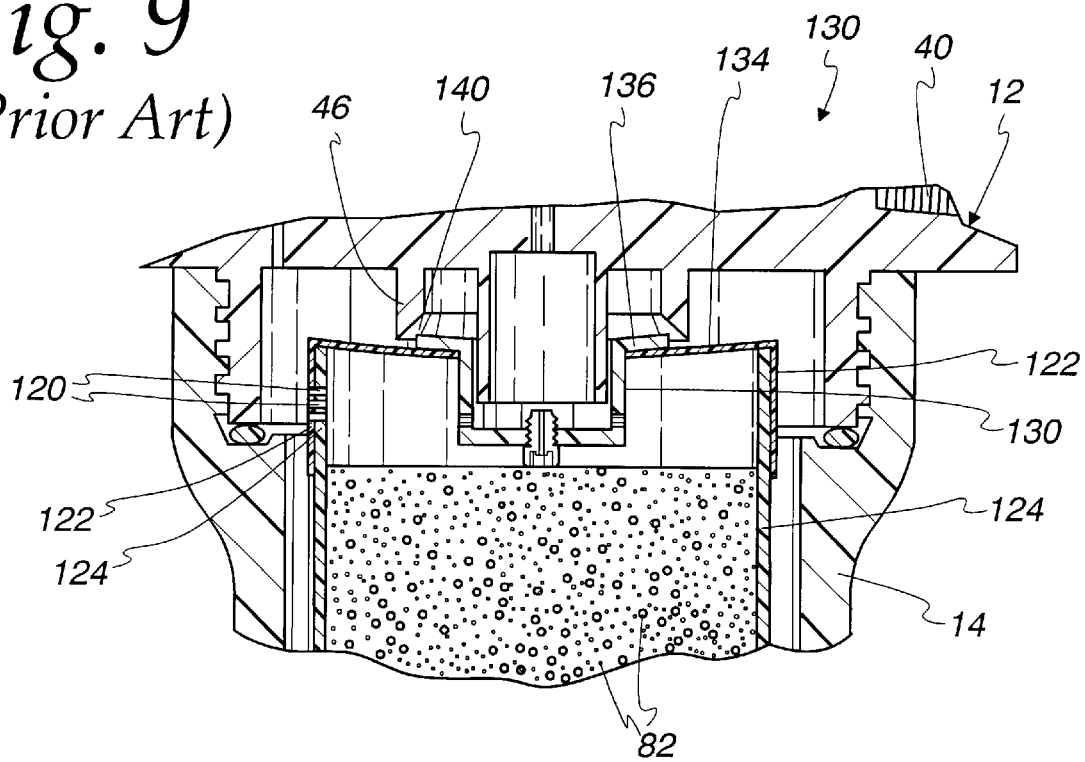
FIG. 9 is a fragmentary cross-sectional view of a prior art cartridge assembly.

Referring now to FIG. 9, it can be seen that the prior art upper end cap assembly includes a plug 130 received in a central aperture formed in the wall 134 of end cap 122. The central hole in wall 134 is formed by a drilling operation using a conventional hole saw. As indicated in FIG. 9, the plug 130 is considerably thicker than the wall 134 of end cap 122, and is seated with a friction fit with the flange 136 of the plug 130 being seated against wall 134. It has been observed that prior art end cap assemblies of the type illustrated in FIG. 9 undergo a deformation, with the wall 134 being dished to form a concave recess facing the dispense head 12. As shown in FIG. 9, this results in a gap 140 being formed between flange 136 and annular ring 46 of the dispense head. This results in a leakage path whereby incoming fluid is allowed to bypass the interior of body 124 avoiding contact with the chemical treatment located therein. Because of the relatively short leakage path localized at the top of the chemical cartridge, severe conditions may be set up within the dispensing apparatus whereby flow through tubular body 124 is reduced, further contributing to an undesirable lowering of chemical injection rates and lower chemical concentrations at the outlet 40 of dispense head 12.

The causes leading to distortion of end cap 122 are not fully understood at this point in time, but is believed to be attributed to the drilling operation formed in the center of wall 134. It is believed that, even if the central hole in wall 134 were formed by other means such as hot knife cutting, a buckling distortion in wall 134 would still result. It is suspected that internal strains and stresses are stored within end cap 122 at the time of its manufacture and that forming a relatively large size central hole, such as that depicted in FIG. 9, releases some of the stresses in the end cap 122 resulting in non-uniform stresses residing in the end cap, tending to distort wall 134.

Returning again to FIGS. 2–4, end cap 74 has a unitary monolithic construction including end wall 150, central stub wall 152 and center wall 154, in addition to an outer wall 156. Except for hole 81 (see FIG. 3) formed in outer wall 156 and relatively small diameter outlet holes 160 formed in center stub wall 152, no holes or other openings are formed in end cap 74. As can be seen for example in FIG. 2, the outlet holes formed at the bottom of central stub wall 152 are of relatively small diameter, of the same relative magnitude as the thickness of the stub wall. Preferably, the outlet holes 152 are formed to meet the requirements of a particular installation and depend, for example, on external factors such as the type of chemical required, and the fluid pressures applied to the dispensing apparatus. The outlet holes 160 are sometimes formed in an otherwise completely fabricated end cap, so s to allow for last minute adjustments to the performance of the metering system. The outlet holes formed in center stub wall 152 have a size, as mentioned, on the order of the thickness of the end cap and for most applications are sized no more than five to ten times the thickness of the end cap, a size much smaller than central apertures formed in prior art end caps, for receiving the stub projection 34 of dispense head 12. Further, unlike the central holes drilled in prior art end caps, outlet holes 160 are formed in longitudinally extending portions of the end cap (i.e., are formed in axially extending center stub walls 152), rather than transversely extending end walls (such as end wall 150 of end cap 74), so as to avoid buckling deformation.

In addition to avoiding compromise of end wall 150, end cap 74 is provided with the central stub wall 152 and center wall 154 which function as a central reinforcement for end wall 150. As can be seen for example in FIG. 4, the stub protrusion 34 extends into the central bore of the stub wall 152 and the close tolerance fit between stub wall 152 and stub portion 34 can be dimensioned so as to provide support at the center of the end cap, while avoiding inward axially directed deformation forces applied to the end cap by the stub portion 34 of the dispense head, as the dispense head is threadingly engaged with the canister 14.

Referring again to FIG. 4, the bottom edges of annular wall 46 of the dispense head contact the upper outer surface of end wall 150 of end cap 74. This provides a reliable sealing engagement between the dispense head and the cartridge assembly. Since dishing or cupping deformation of the end cap 74 is avoided, sealing engagement between the end cap and dispense head is assured. If desired, end cap 74 may be formed of material which provides a substantial bias force to augment the sealing contact between end wall 150 and stub portion 46 of the dispense head.

Preferably, the treatment chemical employed with the dispensing device comprises a solid cake but may also take the form of a loose or compressed powder, a molded solid, or a gel, for example. In the preferred embodiment, the dispensing device 10 is employed for the treatment of water supplies with the chemical agent comprising a cake 82 of polyphosphate material. The treatment chemical is gradually dissolved by water filling the interior of canister 14 and entering the chemical container through holes 80. The dissolved treatment chemical passes through an outlet hole 86 formed in the center of cap 74, so as to combine, as indicated in FIG. 2, with the outlet fluid flow indicated by arrow 42. An optional outlet nozzle or jet 84 may be mounted in the hole 36 in upper end cap 74, although this has not been found to be necessary.

Figure 6:
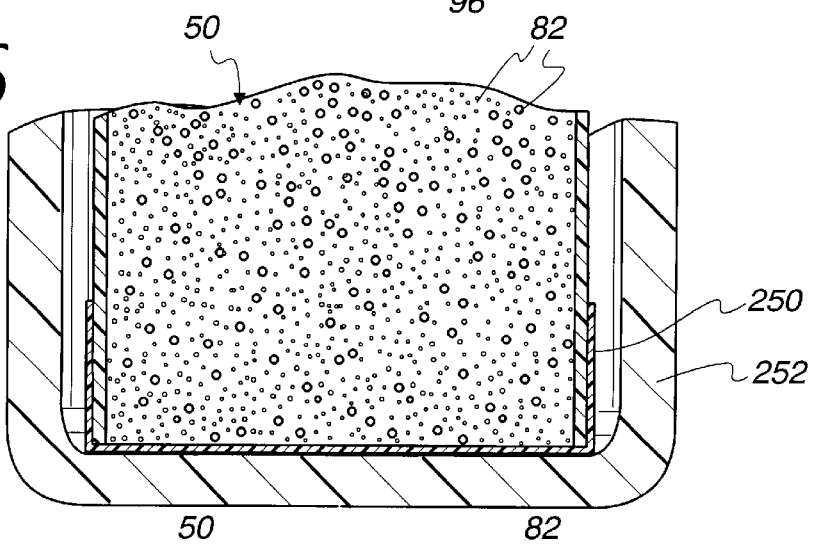
FIGS. 6–8 show alternative embodiments of the bottom construction of the dispensing apparatus.
Figure 7:
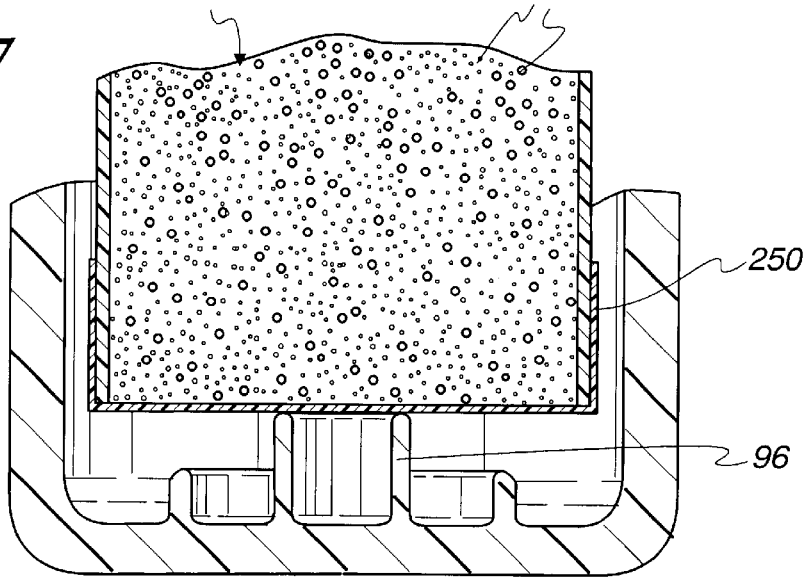
Figure 8:
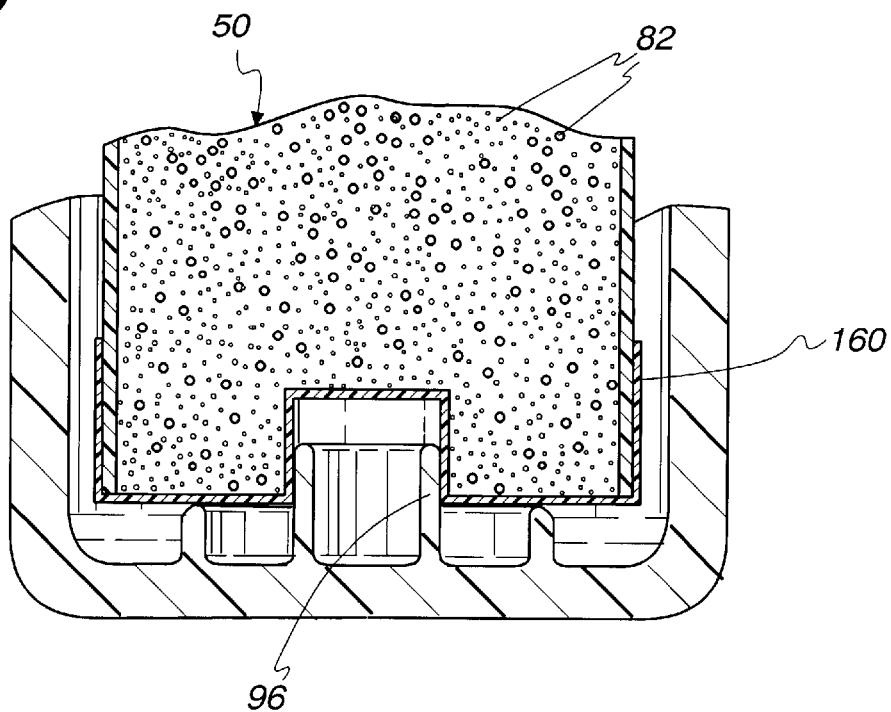

As can be seen at the bottom of FIGS. 1 and 3, for example, canister 14 is provided with an upstanding alignment post 96. Post 96 extends into the interior of the container cavity to help orient the bottom of the chemical container assembly. In the preferred embodiment, a bottoms mounting cup 52 is employed with a central upraised portion which is telescopically fittable over post 96. Referring to FIGS. 6–8, alternative bottom treatments for cartridge assembly 50 are shown. In FIG. 6, a featureless cylindrical end cap 150 is shown mated against a flat bottom wall of a canister 152. In FIG. 7, end cap 150 is shown butted against alignment post 96. In FIG. 8, a lower end cap 160 is shown mated with alignment post 96. Bottom end cap 160 generally resembles upper end cap 74, except for the absence of holes, as flow communication is not required at the bottom portions of the chemical cake 82.

Figure 10:
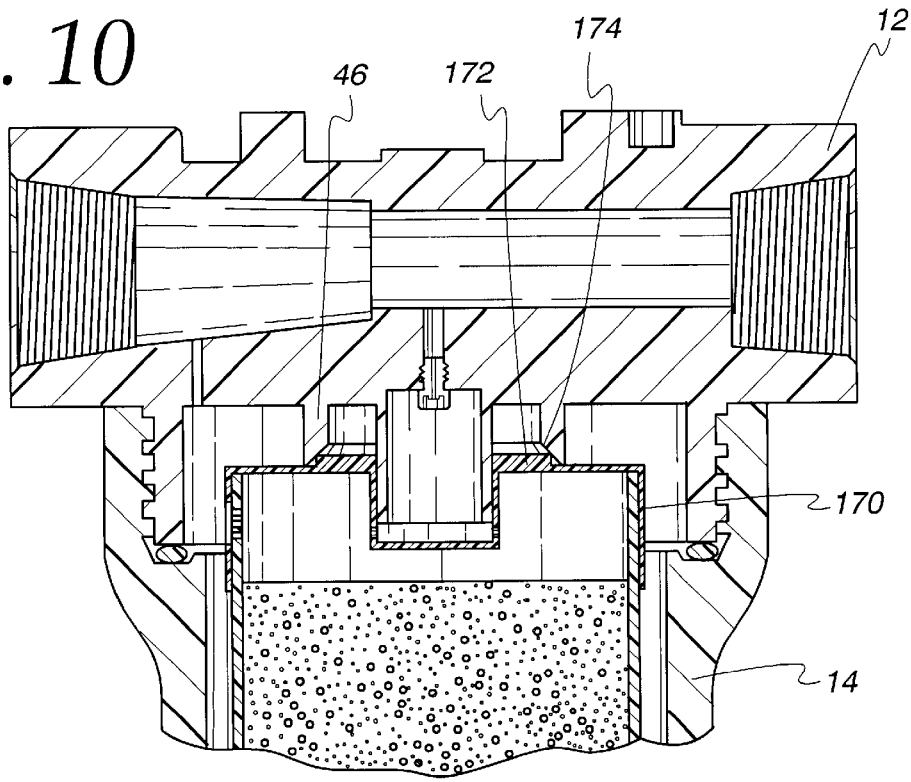
FIGS. 10–13 show alternative embodiments of cartridge assemblies shown installed in a cartridge housing.

Turning now to FIGS. 10–13, alternative embodiments, replacing the upper end cap 74, are shown. In FIG. 10, an upper end cap 170 is substantially identical to upper end cap 74, except for a thickened central portion formed by the addition of a stepped collar member 172, preferably integrally formed with the remainder of the end cap. As indicated in FIG. 10, the outer corner of collar 172 mates with a chamfered end surface 174 of stub projection 46. As can be seen in FIG. 10, two lines of sealing contact are formed between dispense head 12 and end cap 170.

Figure 11:
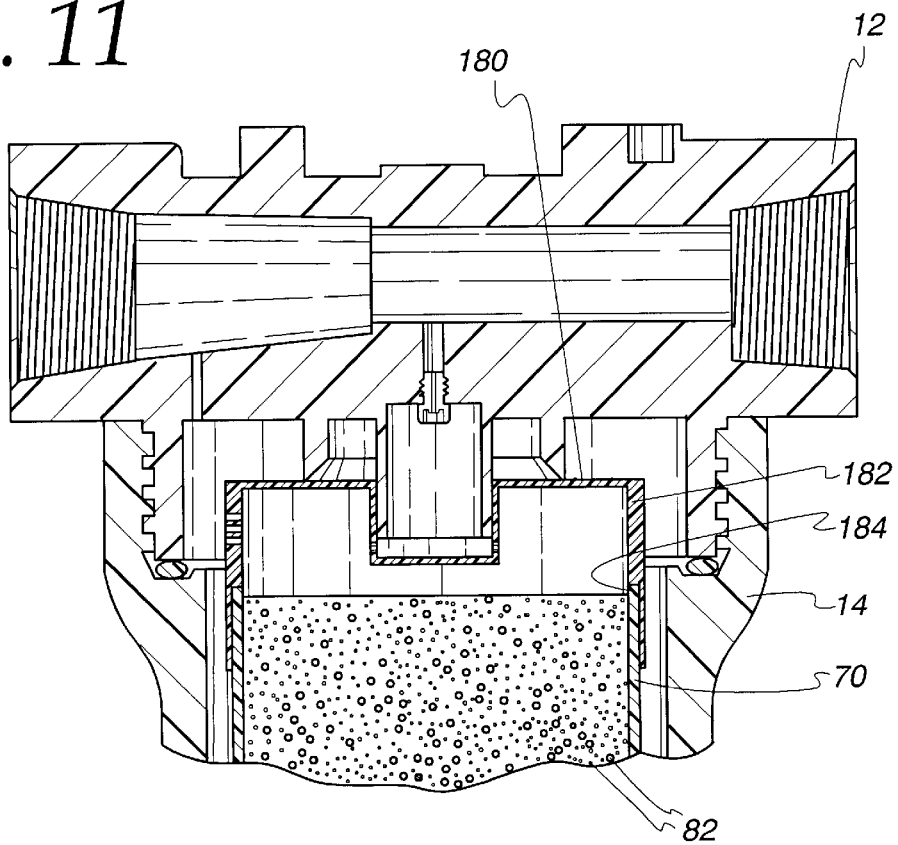

Turning the FIG. 11, an end cap 180 is substantially identical to end cap 74, except for a thickened outer wall 182 having a bottom step portion 184 for receiving the upper free end of tubular body 70. The stepped feature 184 of end cap 180 allows the tubular wall 70 to be cut flush with chemical cake 82. Thus, a continuous bulk cake can be formed, and subsequently divided lengthwise, as needed at the time of manufacture of the chemical cartridge assembly.

Figure 12:
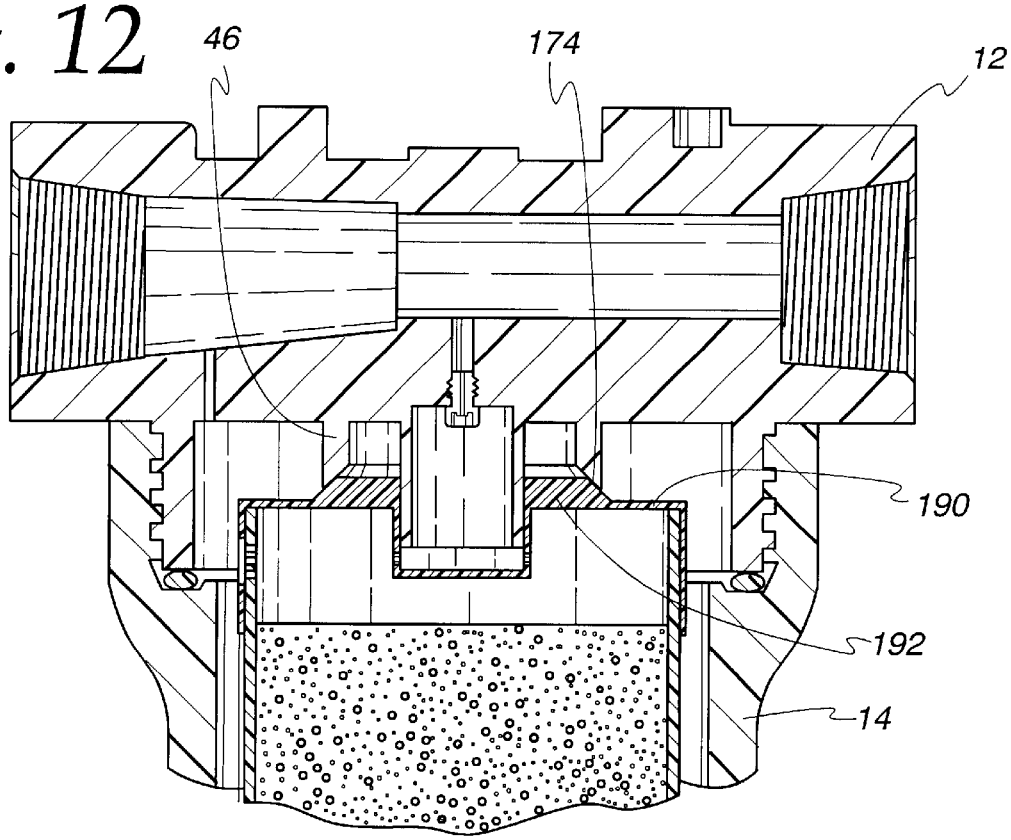

Turning now to FIG. 12, an upper end cap 190 is substantially identical to upper end cap 74, except for the addition of a thickened central portion, preferably formed with the addition of a frustoconical ring 192. Preferably, frustoconical ring 192 is molded with the remainder of upper end cap 190. As can be seen in FIG. 12, a frustoconical sealing band is provided at the overlapping mating joiner of frustoconical ring 192 and the internally chamfered surface 174 of dispense head projection 46.

Figure 13:
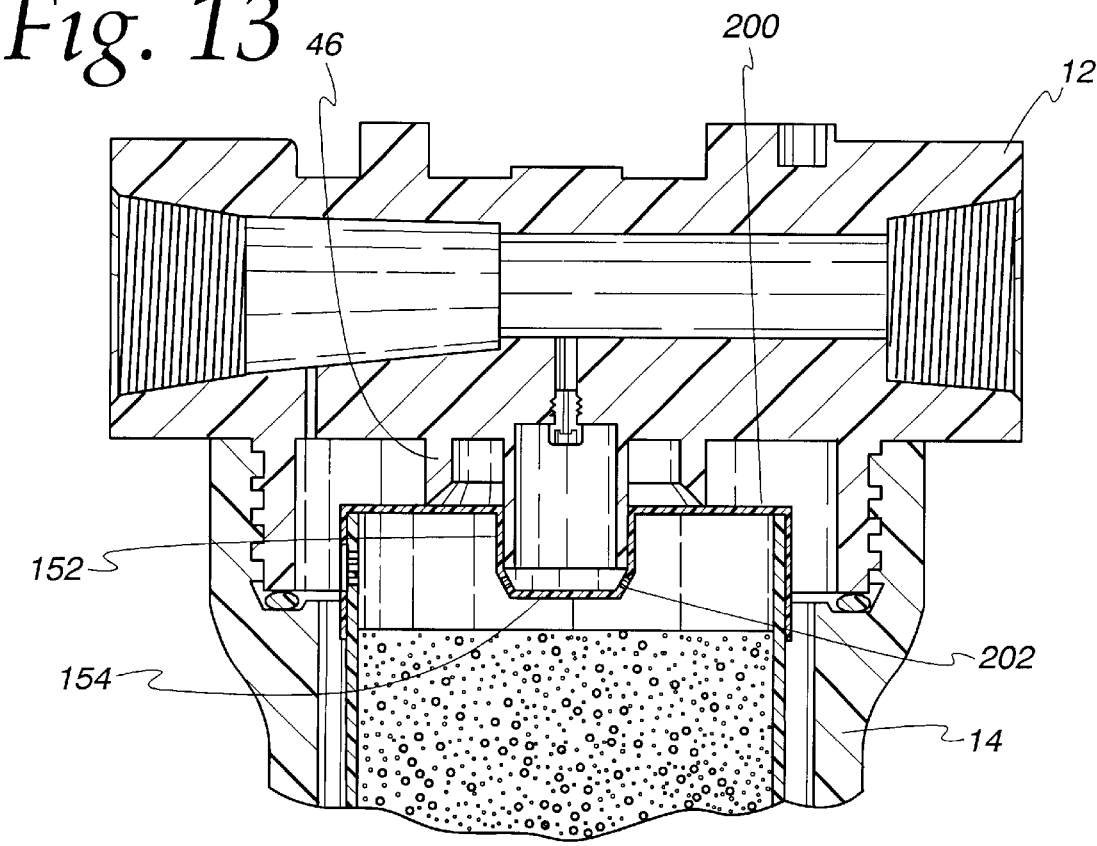

Turning now to FIG. 13, an upper end cap 200 is substantially identical to end cap 74, except for chamfered corners 202 formed between stub wall 152 and center wall 154. Chamfered corners 202 provide a positive stop, limiting the amount of insertion of dispense head projection 46, and ensuring the desired chemical draw.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. Apparatus for insertion into a liquid flow line for dispensing a soluble chemical into the liquid flowing through the flow line comprising:
   a dispense head member including an inlet and an outlet and defining a flow passageway coupling the inlet and the outlet;
   a canister engageable with said dispense head member defining a hollow interior cavity;
   said dispense head flow passageway including flow entry means for directing fluid flow into said hollow interior cavity and flow exit means for directing fluid flow out of said hollow interior cavity;
   the dispense head member and the canister having cooperating means for removably attaching the dispense head to the canister;
   a chemical holding container adapted to fit within said canister;
   said chemical holding container having opposed upper and lower ends and defining inlet and outlet flow pathways at its upper end; and
   said chemical holding container further including a cap consisting essentially of a unitary monolithic body that includes both a center portion defining socket means for connection to said dispense head and an outer portion that substantially covers the entire upper end of the chemical holder container so as to bring said outlet flow pathway of said chemical holding container in flow communication with the flow passageway of said dispense head.

2. Apparatus according to claim 1 wherein the chemical holding container is of a size to fit within the said canister with an annular space between said canister and said chemical holding container.

3. Apparatus according to claim 1 wherein said chemical holding container further comprises a cylindrical sidewall member having an upper end fitted within said cap, said socket means of said cap defining said outlet flow pathway, and said cylindrical sidewall member and said cap defining respective aperture portions cooperating to form said inlet flow pathway.

4. Apparatus according to claim 3 wherein the aperture portion of said cylindrical sidewall member has a predetermined size and the aperture portion formed in said cap is of a larger size so as to expose a portion of the cylindrical sidewall member surrounding the aperture portion of said cylindrical sidewall member.

5. Apparatus according to claim 4 wherein said cylindrical sidewall aperture portion comprises a plurality of closely spaced holes.

6. The apparatus of claim 5 wherein the plurality of holes are arranged to form a linear series.

7. The dispensing device of claim 1 wherein said canister includes an alignment post projecting into said hollow interior cavity so as to be at least partly received in the lower end of said chemical holding container.

8. The apparatus according to claim 1 wherein said flow exit means includes a stub portion of said dispense head projecting into said hollow interior cavity so as to be at least partly received in said socket means of said cap.

9. The apparatus of claim 8 wherein said dispense head stub portion includes a free end and said cap includes a collar outwardly projecting from said center portion, surrounding said socket means so as to engage said stub portion free end.

10. The apparatus of claim 9 wherein said stub portion free end includes an inwardly tapered end surface.

11. The apparatus of claim 10 wherein said collar has a nontapered outer corner which mates with said stub portion inwardly tapered end surface.

12. The apparatus of claim 10 wherein said cap is made of plastic material and said collar outer corner is deformable upon engagement with said stub portion inwardly tapered end surface.

13. The apparatus of claim 10 wherein said collar has a tapered outer surface which mates with said stub portion inwardly tapered end surface.

14. The apparatus of claim 1 wherein said socket means has a generally cylindrical sidewall, enclosed at its bottom end by an end wall forming a generally square corner with the sidewall.

15. The apparatus of claim 1 wherein said socket means has a generally cylindrical sidewall, enclosed at its bottom end by an end wall forming a generally frustoconical corner with the sidewall.

16. A dispensing device for dispensing a chemical agent into a fluid flow, comprising:
   a dispense head having inlet and outlet means for coupling to said fluid flow and defining a flow passageway coupling said inlet and said outlet means;
   a canister engageable with said dispense head and defining a hollow interior cavity;
   said flow passageway in said dispense head including flow entry means for directing fluid flow into said hollow interior cavity and flow exit means for directing fluid flow out of said hollow interior cavity of said canister;
   a chemical holding container within said hollow interior cavity of said canister, in contact with the fluid flow;
   said chemical holding container having a tubular body with opposed upper and lower ends and defining a hollow, chemical-receiving interior and said chemical holder container further defining inlet and outlet flow pathways at its upper end;
   said tubular body including an inlet aperture portion adjacent its upper end; and
   a cap enclosing the upper end of said tubular body, said cap consisting essentially of a unitary monolithic body that includes both a center portion defining socket means extending into said tubular body hollow interior and providing at least one outlet aperture for flow connection to said flow exit means and a second outer portion that substantially covers the entire upper end of the chemical holder container.

17. The dispensing device of claim 16 further comprising a bottom cap enclosing the lower end of said tubular body.

18. The dispensing device of claim 17 wherein said bottom cap includes an inwardly extending depression; and
   said canister includes an alignment post projecting into said hollow interior cavity of said canister so as to be at least partly received in the inwardly extending depression of said bottom cap.

19. The dispensing device of claim 16 wherein said inlet aperture portion defines a plurality of said inlet holes formed in a linear array, generally parallel to a central axis of said tubular body.

20. The dispensing device of claim 19 wherein said cap includes an inlet aperture-defining edge surrounding said plurality of said tubular body inlet holes.

21. The dispensing device of claim 16 wherein said flow exit means comprises a stub portion of said dispense head projecting into said hollow interior cavity of said canister so as to be at least partly received in the cap socket means.

22. The dispensing device of claim 21 wherein said dispense head stub portion includes a free end and said cap includes a collar outwardly projecting from said center portion, surrounding said socket means so as to engage said stub portion free end.

23. The dispensing device of claim 22 wherein said stub portion free end includes an inwardly tapered end surface.

24. The dispensing device of claim 23 wherein said collar has a nontapered outer corner which mates with said stub portion inwardly tapered end surface.

25. The dispensing device of claim 24 wherein said cap is made of plastic material and said collar nontapered outer corner is deformable upon engagement with said stub portion inwardly tapered end surface.

26. The dispensing device of claim 23 wherein said collar has a tapered outer surface which mates with said stub portion inwardly tapered end surface.

27. The dispensing device of claim 16 wherein said socket means has a generally cylindrical sidewall, enclosed at its bottom end by an end wall forming a generally square corner with the sidewall.

28. The dispensing device of claim 16 wherein said socket means has a generally cylindrical sidewall, enclosed at its bottom end by an end wall forming a generally frustoconical corner with the sidewall.

* * * * *